(12) United States Patent
Langer et al.

(10) Patent No.: US 8,588,616 B2
(45) Date of Patent: Nov. 19, 2013

(54) METHOD AND APPARATUS FOR OPTICALLY TRANSMITTING DATA

(75) Inventors: Klaus-Dieter Langer, Berlin (DE); Joachim Walewski, Unterhaching (DE)

(73) Assignees: Siemens Aktiengesellschaft, Munich (DE); Fraunhofer Gesellscaft zur Forderung der Angewandten Forschung E.V., Munich (DE)

( * ) Notice: Subject to any disclaimer, the term of this patent is extended or adjusted under 35 U.S.C. 154(b) by 104 days.

(21) Appl. No.: 13/266,360

(22) PCT Filed: Mar. 26, 2010

(86) PCT No.: PCT/EP2010/053981
§ 371 (c)(1),
(2), (4) Date: Oct. 26, 2011

(87) PCT Pub. No.: WO2010/124917
PCT Pub. Date: Nov. 4, 2010

(65) Prior Publication Data
US 2012/0045219 A1 Feb. 23, 2012

(30) Foreign Application Priority Data

Apr. 28, 2009 (DE) .......... 10 2009 019 203
Jan. 27, 2010 (DE) .......... 10 2010 005 885

(51) Int. Cl.
*H04B 10/00* (2013.01)
*H04B 10/04* (2013.01)

(52) U.S. Cl.
USPC ........... 398/118; 398/127; 398/189; 398/190; 139/191

(58) Field of Classification Search
USPC ................ 398/182–201, 118, 127
See application file for complete search history.

(56) References Cited

U.S. PATENT DOCUMENTS

| | | | |
|---|---|---|---|
| 7,689,130 B2 * | 3/2010 | Ashdown ............... | 398/172 |
| 8,253,353 B2 * | 8/2012 | Baggen et al. .......... | 315/308 |
| 2007/0024571 A1 * | 2/2007 | Maniam et al. .......... | 345/102 |
| 2007/0092264 A1 * | 4/2007 | Suzuki et al. .......... | 398/189 |
| 2008/0215391 A1 * | 9/2008 | Dowling et al. .......... | 705/7 |
| 2009/0196613 A1 * | 8/2009 | Linnartz .............. | 398/78 |
| 2009/0214225 A1 * | 8/2009 | Nakagawa et al. ...... | 398/191 |
| 2010/0254712 A1 * | 10/2010 | Linnartz et al. ....... | 398/172 |
| 2010/0327764 A1 * | 12/2010 | Knapp ................ | 315/250 |

FOREIGN PATENT DOCUMENTS

| | | |
|---|---|---|
| WO | 2008/001262 A1 | 1/2008 |
| WO | 2009/010909 A1 | 1/2009 |

OTHER PUBLICATIONS

Narra et al, An effeective LED Dimming Approach, 2004, Industry Applications Conference, vol. 3, pp. 1671-1676.*

(Continued)

*Primary Examiner* — Ken Vanderpuye
*Assistant Examiner* — Dibson Sanchez
(74) *Attorney, Agent, or Firm* — King & Spalding L.L.P.

(57) ABSTRACT

In a method and an apparatus for the optical transmission of data by a pulse-width modulated light source (LED), in which a set dimming factor (N) is replaced with a cycle-dependent dimming factor (NI), the cycle-dependent dimming factor is modulated for encoding the data to be transmitted and corresponds to the set dimming factor over a time interval which is resolvable for the human eye.

14 Claims, 1 Drawing Sheet

(56) References Cited

OTHER PUBLICATIONS

Sugiyama, H., et al., "Experimental Investigation of Modulation Method for Visible-Light Communications", Institute of Electronics, Information and Communication Engineers, IEICE Trans. Commun., vol. E89-B, No. 12; pp. 3393-3400, Dec. 2006.

Sugiyama, H., et al., "Brightness Control Methods for Illumination and Visible-Light Communication Systems", Proceedings of the Third International Conference on Wireless and Mobile Communications; 6 pages, 2007.

International PCT Search Report and Written Opinion, PCT/EP2010/053981, 11 pages, Aug. 12, 2010.

* cited by examiner

METHOD AND APPARATUS FOR OPTICALLY TRANSMITTING DATA

CROSS-REFERENCE TO RELATED APPLICATIONS

This application is a U.S. National Stage Application of International Application No. PCT/EP2010/053981 filed Mar. 26, 2010, which designates the United States of America, and claims priority to German Application No. 10 2009 019 203.4 filed Apr. 28, 2009 and German Application No. 10 2010 005 885.8 filed Jan. 27, 2010. The contents of which are hereby incorporated by reference in their entirety.

TECHNICAL FIELD

The invention relates to a method and an apparatus for optically transmitting data by means of a pulse-width-modulated light source.

BACKGROUND

The wide distribution of mobile terminals, such as mobile telephones, for example, demands fast data transmission via wireless interfaces and local wireless data networks. Light-emitting diodes (LEDs) can be used for lighting rooms in buildings. Light-emitting diodes, also referred to as LEDs, feature low energy consumption and long service life. Light-emitting diodes provided for lighting rooms inside buildings are dimmed in order to enable the luminance level within a room to be set according to the respective requirements.

SUMMARY

According to various embodiments, a method and an apparatus for optically transmitting data by means of a dimmable light source can be created.

According to an embodiment, in a method for optically transmitting data by means of a pulse-width-modulated light source, a pulse duty factor set for controlling the brightness of the pulse-width-modulated light source is defined as a ratio between a blanking of the light source and a period length of a pulse width modulation cycle, a cycle-dependent pulse duty factor is varied over a plurality of pulse width modulation cycles such that in each case the data to be transmitted is encoded by way of the variation of the cycle-dependent pulse duty factor, and, the value of an arithmetic mean formed by way of the plurality of cycle-dependent pulse duty factors essentially corresponds to the set pulse duty factor.

According to a further embodiment, the light source can be a light-emitting diode. According to a further embodiment, the data can be exchanged wirelessly with a mobile terminal. According to a further embodiment, the data can be transmitted in at least one symbol, and wherein a symbol can be defined by at least one binary bit. According to a further embodiment, a value of a respective symbol can be encoded at least partially by a duration of the blanking of the light source within the pulse width modulation cycle. According to a further embodiment, a value of a respective symbol can be encoded at least partially by a duration of a bright-up time of the light source within the pulse width modulation cycle. According to a further embodiment, a value of a symbol can be encoded at least partially by arranging the blanking of the light source within the pulse width modulation cycle. According to a further embodiment, the bright-up time can be defined within the pulse width modulation cycle as a first bright-up time range and a second bright-up time range, whereby the first bright-up time range is constant over a plurality of pulse width modulation cycles, and, whereby the second bright-up time range is in each case an integer multiple of a minimum second bright-up time range, whereby the value of the integer multiple corresponds to a decimal value of the symbol. According to a further embodiment, in the case of a set pulse duty factor of zero a binary transmission may take place and the second bright-up time range can be considerably shorter than the pulse width modulation cycle. According to a further embodiment, an optical output of the light source can be increased by a factor which corresponds to a quotient of the duration of the second bright-up time range and the twofold value of the pulse width modulation cycle.

According to another embodiment, an apparatus for optically transmitting data by means of a pulse-width-modulated light source may comprise: a data modulation module for receiving data to be transmitted and for the respective variation of a cycle-dependent pulse duty factor over a plurality of pulse width modulation cycles such that the data to be transmitted is encoded by means of the variation of the cycle-dependent pulse duty factor, whereby the value of an arithmetic mean formed by way of a plurality of cycle-dependent pulse duty factors essentially corresponds to the set pulse duty factor.

According to a further embodiment of the apparatus, the apparatus may have means for implementing the method as described above.

BRIEF DESCRIPTION OF THE DRAWINGS

In order to explain certain features, embodiments of the apparatus and the method for optically transmitting data by means of a pulse-width-modulated light source are described below with reference to the drawing.

where.

DETAILED DESCRIPTION

Figure 1A:
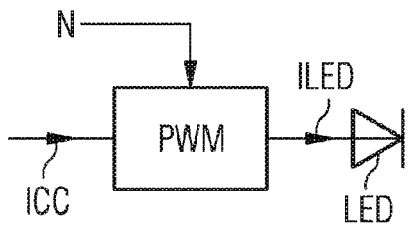
FIG. 1a shows a schematic representation of a conventional pulse-width-modulated light source.

According to various embodiments, a method for optically transmitting data by means of a pulse-width-modulated light source can be created, wherein for brightness control of the pulse-width-modulated light source a set pulse duty factor is specified as the ratio between a blanking time of the light source and one period length of a pulse width modulation cycle.

According to various embodiments, in this situation a cycle-dependent pulse duty factor is varied over a plurality of pulse width modulation cycles such that in each case the data to be transmitted is encoded by way of the variation of the cycle-dependent pulse duty factor. In this situation, the value of an arithmetic mean formed by way of the plurality of cycle-dependent pulse duty factors essentially corresponds to the set pulse duty factor.

Various embodiments are based on the idea of leaving unchanged the set pulse duty factor, which corresponds to a brightness of the pulse-width-modulated light source set via a dimming factor such that viewed over a plurality of pulse width modulation cycles an average pulse duty factor is produced which corresponds to the set pulse duty factor.

In other words, according to various embodiments the pulse duty factor is changed in individual time segments such that a transmission of data is made possible by means of an encoding by way of the momentarily changed pulse duty factor, without the brightness set by means of a pulse width modulation experiencing a change overall.

According to various embodiments, here the inertia of the human eye, which cannot perceive a transient change in the pulse width modulation as perceptible differences in brightness, is utilized. Incidentally, this principle is already employed by the pulse width modulation for brightness control itself.

According to an embodiment, the light source is implemented as a light-emitting diode which, in addition to the advantages stated in the introduction, in particular offers the advantage of a short and precise turn-on time.

Various embodiments can be preferably used for a wireless exchange between the light source and a mobile terminal.

According to one embodiment, data transmission takes the form of symbols, it being possible for one symbol to consist of one or more binary bits.

According to one embodiment, the value of a respective symbol is encoded at least partially by a duration of the blanking of the light source within the pulse width modulation cycle. According to an alternative embodiment, the value of a respective symbol is encoded at least partially by the duration of a bright-up time of the light source within the pulse width cycle. The two latterly mentioned embodiments are therefore manifestations of the basic concept of various embodiments of transmitting information by way of the cycle-dependent pulse duty factor.

According to a further embodiment, the value of a symbol is furthermore encoded by an arrangement of the blanking of the light source within the pulse width modulation cycle. This design of various embodiments corresponds to a pulse position modulation wherein, irrespective of the set pulse duty factor, an arrangement of blanking and bright-up times is changed. In the simplest design of this embodiment, the bright-up time—in other words light source turned on—can in this situation be interchanged with the blanking—in other words light source turned off—in order in this manner to encode a further binary bit. Pulse position modulation also does not result in any perceptible change in the set brightness.

According to a further embodiment, a subdivision of the bright-up time within the pulse width modulation cycle is provided such that a first bright-up time range remains constant in different pulse width modulation cycles, and a second bright-up time range is in each case an integer multiple of a minimum second bright-up time range, whereby the value of the integer multiple corresponds to a decimal value of the symbol. This design offers the advantage that a synchronization of the communication partners is enabled by way of the constant first bright-up time range, while the second bright-up time range is to be encoded and/or decoded in a simple manner on the basis of an integer multiplication with a minimum bright-up time range.

Furthermore, other embodiments create an apparatus for optically transmitting data by means of a pulse-width-modulated light source.

FIG. 1a shows an apparatus known from the prior art, consisting of a light source LED and a pulse width modulator PWM which generates a pulse-width-modulated carrier signal. The pulse width modulator PWM is supplied by a supply current ICC. The supply current ICC is a DC current of variable magnitude, for example. Brightness control of the light source LED is achieved by setting a dimming factor N, it being possible, for example, for a manipulated variable of a corresponding adjuster—not shown—to influence the dimming factor and for the manipulated variable to be fed to the pulse width modulator. Here the dimming factor N corresponds to a pulse duty factor of the current ILED generated on the basis of the set dimming factor by the pulse width modulator PWM, said current having a pulse width modulation which in its time characteristic corresponds to a characteristic of the optical power of the light source LED shown below.

The further description of the figures is given with further reference to the function units of each of the preceding figures. In this connection, identical reference characters in different figures represent identical function units.

Figure 2A:
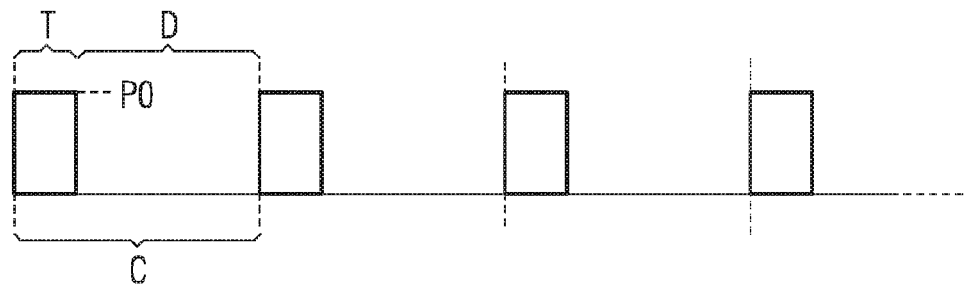
FIG. 2a shows a signal diagram for explaining the mode of operation of a conventional pulse-width-modulated light source.

FIG. 2a shows a time characteristic of the optical power of the light source LED, it being possible for the time characteristic of the optical power to appear in sequence with the pulse-width-modulated current ILED which has an essentially identical characteristic.

Four pulse width modulation cycles C are shown in FIG. 2a, it being possible for a respective cycle C to consist of a respective bright-up time T and a blanking time D. For the sake of clarity, in the drawing this is denoted only for the first pulse width modulation cycle C illustrated at the far left.

The light source is activated during the bright-up time T and emits optical power with an optical performance characteristic P0. During the blanking time D the light source is turned off and radiates a power which is essentially zero.

The pulse width modulation of the light source LED is used to set the optical power, it being possible for the inertia of the human eye to be utilized in such a way that due to the time period of one cycle C the bright-up times T and blanking times D are sensed as continuous optical power.

The brightness of the light source LED is variable depending on the dimming factor N, which is indicated in the following mathematical notation as $\eta$, and the quotient between the blanking time D—indicated in the following mathematical notation as $T_d$—within a cycle C, as well as the cycle time C—indicated in the following mathematical notation as $T_c$—which gives $$\eta = \frac{T_d}{T_c} \qquad (1)$$

The dimming factor $\eta$ is identical to the pulse duty factor likewise defined as the quotient between the blanking time D and the cycle time C.

With a dimming factor of $\eta=1$ the optical radiated power becomes 0, that is to say complete darkness; with a dimming factor of $\eta=0$ the perceived optical power corresponds to the optical performance characteristic P0, that is to say the maximum available brightness.

The dimming factor $\eta$ shown graphically in FIG. 2a is approximately 0.77.

According to various embodiments measures can be created to additionally provide the pulse-width-modulated light source LED shown in FIG. 2a for optical data transmission.

According to various embodiments the dimming factor $\eta$ is varied from one cycle C to the next cycle C, whereby the variation is chosen such that over a time interval which can be resolved by the human eye the mean dimming factor corresponds to the set dimming factor $\eta$. In other words, according to various embodiments a cycle-dependent dimming factor $\eta_i$ is varied over a plurality N of individual cycles i such that the data to be transmitted is encoded by means of the variation of the cycle-dependent dimming factor $\eta_i$, whereby the value of an arithmetic mean formed by way of a plurality of cycle dependent dimming factors $\eta_i$ $$\eta = \frac{1}{N}\sum_{i=1}^{N}\eta_i \quad (2)$$

essentially corresponds to the dimming factor $\eta$ set for the purpose of controlling the brightness of the light source LED.

In this situation, the stated plurality N of cycle-dependent pulse duty factors $\eta_i$ is formed for example by means of a plurality of cycles C, the sum of which corresponds to a time interval which can be resolved by the human eye. Such a time interval which can be resolved by the human eye is chosen for example in the region of about 50 milliseconds.

Figure 2B:
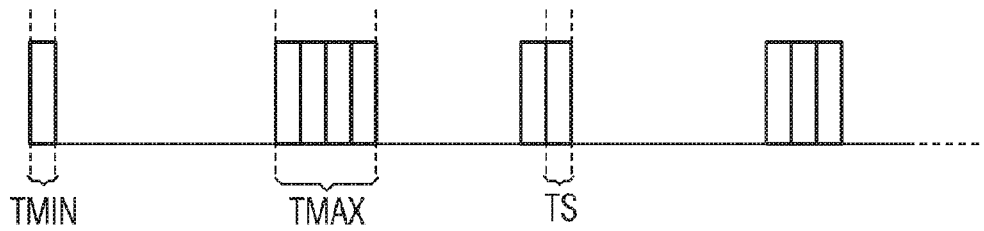
FIG. 2b shows a signal diagram for explaining the mode of operation of the method for optically transmitting data by means of a pulse-width-modulated light source according to various embodiments.

FIG. 2b shows a time sequence diagram of a pulse width modulation using the means according to various embodiments. As in FIG. 2a and also in FIG. 2b the optical power of the light source LED is plotted on the perpendicular axis over the horizontal time axis.

In the first instance, reference is made in the description to the left-hand portion of FIG. 2b, whereby the time duration of the bright-up time T varies between a minimum value TMIN and a maximum value TMAX.

In the first pulse width modulation cycle C, FIG. 2b shows a first bright-up time range having a time duration of TMIN, followed by a further pulse width modulation cycle C having a bright-up time TMAX which corresponds to a fourfold duration of TMIN, followed in turn by a further pulse width modulation cycle C having a bright-up time which corresponds to a twofold minimum bright-up time TMIN, finally followed by a pulse width modulation cycle C having a bright-up time T which corresponds to a threefold duration of the minimum bright-up time TMIN.

In the following mathematical notation the minimum bright-up time TMIN is denoted as $T_t^{min}$ and the maximum bright-up time TMAX is denoted as $T_t^{max}$. The cycle-dependent bright-up time, which moves between a value of $T_t^{min}$ and $T_t^{max}$, is denoted as $T_{t,i}$ in the following.

In an embodiment, the length, or time duration, of a cycle-dependent bright-up time $T_{t,i}$ is chosen such that the time duration thereof encodes a symbol value of the data to be transmitted. In this situation, in this embodiment an identical time duration is chosen for the minimum bright-up time $T_t^{min}$ and for a symbol step described in the following. In order to set a multiplicity of cycle-dependent dimming factors $\eta_i$, this identical time duration can also be chosen for the benefit of any desired ratios between the minimum bright-up time $T_t^{min}$ and the symbol step.

The value of the cycle-dependent dimming factor $\eta_i$ results as the quotient $$\eta_i = \frac{T_{d,i}}{T_c} \quad (3)$$

of the cycle-dependent blanking $T_{d,i}$ and the cycle duration $T_c$. The cycle duration $T_c$ is in general constant. The following furthermore applies to the cycle-dependent blanking $T_{d,i}$ $$T_{d,i} = T_c - T_{t,i} \quad (4)$$

According to an alternative embodiment, instead of an encoding by means of the cycle-dependent bright-up time $T_{t,i}$ it is also possible to effect an encoding by means of a cycle-dependent blanking.

An encoding by means of the cycle-dependent bright-up time $T_{t,i}$ or by means of the cycle-dependent blanking can be effected both in analog and also in digital representation with discrete values.

According to an embodiment described in the following, a digital representation by means of the cycle-dependent bright-up time $T_{t,i}$ is described. In this case, a symbol which can for example be represented in binary form with a maximum length of $2^{b-1}$, where b corresponds to a bit length of the symbol, is transferred into the corresponding digitized length of a bright-up time. With regard to a statistically even distribution of the symbols, the equation (2) reduces to $$\eta = 1 - \frac{T_t^{max} + T_t^{min}}{2T_c} \quad (5)$$

The following additionally applies $$T_{t,i} = T_t^{min} - s_i \cdot \Delta T_s \quad (6)$$

where $\Delta T_s$ signifies a time difference between two numerically consecutive values of the symbol s, therefore for example the difference between "1" and "2", "1" and "3", etc. Furthermore, $s_i$ represents the value of the symbol s in the cycle i.

With the aid of equation (6), equation (5) is simplified to $$\eta = 1 - \frac{T_t^{min}}{T_c} - \frac{\Delta T_s}{2T_c}(2^b - 1) \quad (7)$$

With the aid of this equation, it is thus possible to find a reference between the set dimming factor $\eta$ and the bit length b of a symbol. The following results when the equation (7) is solved for b $$b = \left\lfloor lb\left[1 + \frac{2T_c}{\Delta T_s}\left(1 - \eta - \frac{T_t^{min}}{T_c}\right)\right]\right\rfloor \quad (8)$$

The outermost square bracket here signifies a mathematical operation for rounding down to the next smaller natural number.

In this situation, FIG. 2b shows the solution for the case of a bit length b=2. An arithmetic mean of the cycle-dependent dimming factor $\eta_i$ corresponds in this case essentially to the set dimming factor $\eta$ according to FIG. 2a. The mean dimming factor is therefore not changed by using the means according to various embodiments.

Figure 1B:
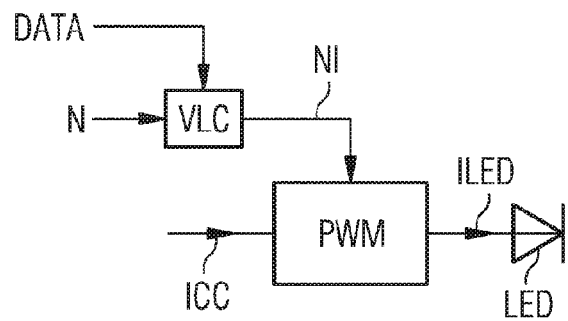
FIG. 1b shows a schematic representation of an embodiment of the apparatus for optically transmitting data by means of a pulse-width-modulated light source.

FIG. 1b illustrates an arrangement according to various embodiments for the transmission of data by means of a pulse-width-modulated light source. In addition to the functional components known from FIG. 1a, a data modulation module VLC according to various embodiments is provided which as distinguished from FIG. 1a receives the magnitude of the dimming factor N or $\eta$ intended for controlling the brightness and forwards it in the form of a cycle-dependent factor NI or $\eta_i$ to the pulse width modulator PWM. The cycle-dependent dimming factor NI is modulated in this case by means of the data DATA delivered to the data modulation module VLC.

It goes without saying that an exemplary embodiment according to FIG. 1b is to be understood merely as an example and that a plurality of light sources can be provided in a practical implementation.

In an alternative embodiment, the blanking can be effected directly on a communication module.

As a result of the variation according to various embodiments of the cycle-dependent pulse duty factor NI or of the cycle-dependent dimming factor NI from one cycle to another, it is possible by using a conventional pulse width modulator PWM or "dimmer" to modulate information onto the light emitted by a dimmed light source LED in a very simple manner. An additional "submodulation" onto the square-wave current ILED, as proposed in the literature, is dispensed with in an advantageous manner. By connecting a data modulation module VLC upstream, a transmission of data DATA using an ordinary pulse width modulator PWM is thereby possible in a very simple manner.

In this situation, it is advantageous to choose the value of the cycle-dependent dimming factor NI such that for an "Idle" state within which no data is to be transmitted it corresponds to the respective arithmetic mean according to equation (2). This can for example take place by means of padding, in other words by a transmission of statistically random noise data. In an alternative embodiment a repeated sending of a symbol is provided, whereby the dimming factor corresponding to the symbol comes as close as possible to the predetermined dimming factor N.

With regard to a practical implementation of various embodiments, a commercially available light-emitting diode having a minimum implementable pulse length of 4 ns is chosen, for example. A repetition rate of 500 kHz results for a typical pulse width modulation. Therefore with these parameters, according to equation (8) a maximum bit length of 8 results, and thus a maximum data rate of 4 Mbit/s.

This data rate can be achieved for a dimming factor N of 0.5 whereas it is zero in each case for dimming factor values of 1 and 0. It should be noted in this situation that the data rate depends exponentially on the deviation of the dimming factor from the value 0.5.

In order to nevertheless transmit data in the case of an undimmed illumination having maximum brightness, $\eta=0$ in other words, according to a further embodiment the following procedure is used. A binary transmission is chosen, in other words with the exclusive use of the values 0 and 1, whereby $\Delta T$ is considerably shorter than $T_c$.

Furthermore, the average emitted light output $P_0$ is increased by $\Delta T_s/2T_c$. In order that the mean emitted light output thus remains unchanged, it is also possible to transmit information using undimmed light.

In order to facilitate a synchronization of the light source for the recipient of the light pulses and to transfer the values $T_t^{min}$ and $T_t^{max}$, according to a further embodiment a send of a repeat of the shortest and longest symbols is provided at the start of a data block.

If moreover a transfer of the symbol step $\Delta T_s$ is provided, it is also possible to transfer this value. It is therefore possible for example to send a predefined symbol sequence before the actual data and after the repeated transfer of $T_t^{min}$ and $T_t^{max}$, for example "$2^b-1$", "$2^b-2$", . . . "0". The recipient can then determine $\Delta T_s$ from this symbol sequence.

The method according to various embodiments for optically transmitting data causes no electromagnetic waves and also cannot be influenced by electromagnetic waves. The method according to various embodiments can be used, in particular, when LED lighting is already provided. In this case the light-emitting diodes can be addressed by means of a power line transmission method, for example.

The data transmission is realized by means of an easily screened communication medium. Since the data is optically transmitted it can for example be easily screened from its surroundings by a wall or a curtain. Bug-proofing can therefore be achieved.

The method according to various embodiments allows secure optical transmission of data by means of a dimmable light-emitting diode LED to portable terminals inside an illuminated room and is insensitive to radio signals. Any type of light-emitting diodes can be employed, for example light-emitting diodes which produce white light. Alternately, light-emitting diodes with a narrower modulation bandwidth than white light-emitting diodes can be used.

What is claimed is:

1. A method for optically transmitting data by means of a pulse-width-modulated light source, comprising:
    defining a pulse duty factor set for controlling the brightness of the pulse-width-modulated light source as a ratio between a blanking of the light source and a period length of a pulse width modulation cycle, and
    varying a cycle-dependent pulse duty factor over a plurality of pulse width modulation cycles such that in each case the data to be transmitted is encoded by way of the variation of the cycle-dependent pulse duty factor,
    wherein an arithmetic mean of the plurality of cycle-dependent pulse duty factors essentially corresponds to the set pulse duty factor,
    wherein the data is transmitted in at least one symbol defined by at least one binary bit,
    wherein a value of a respective symbol is encoded at least partially by a duration of a bright-up time of the light source within the pulse width modulation cycle,
    wherein the bright-up time is defined within the pulse width modulation cycle as a first bright-up time range and a second bright-up time range,
    wherein the first bright-up time range is constant over a plurality of pulse width modulation cycles, and
    wherein the second bright-up time range is an integer multiple of a minimum second bright-up time range, wherein the value of the integer multiple corresponds to a decimal value of the symbol.

2. The method according to claim 1, wherein the light source is a light-emitting diode.

3. The method according to claim 1, wherein the data is exchanged wirelessly with a mobile terminal.

4. The method according to claim 1, wherein a value of a respective symbol is encoded at least partially by a duration of the blanking of the light source within the pulse width modulation cycle.

5. The method according to claim 4, wherein a value of a symbol is encoded at least partially by arranging the blanking of the light source within the pulse width modulation cycle.

6. The method according to claim 1, wherein in the case of a set pulse duty factor of zero a binary transmission takes place and whereby the second bright-up time range is considerably shorter than the pulse width modulation cycle.

7. The method according to claim 6, wherein an optical output of the light source is increased by a factor which corresponds to a quotient of the duration of the second bright-up time range and the twofold value of the pulse width modulation cycle.

8. An apparatus for optically transmitting data by means of a pulse-width-modulated light source comprising:
    a data modulation module for receiving data to be transmitted and for the respective variation of a cycle-dependent pulse duty factor over a plurality of pulse width modulation cycles such that the data to be transmitted is encoded by means of the variation of the cycle-dependent pulse duty factor, wherein an arithmetic mean of the plurality of cycle-dependent pulse duty factors essentially corresponds to the set pulse duty factor, wherein the data is transmitted in at least one symbol defined by at least one binary bit, wherein a value of a respective symbol is encoded at least partially by a duration of a bright-up time of the light source within the pulse width modulation cycle, wherein the bright-up time is defined within the pulse width modulation cycle as a first bright-up time range and a second bright-up time range, wherein the first bright-up time range is constant over a plurality of pulse width modulation cycles, and wherein the second bright-up time range is an integer multiple of a minimum second bright-up time range, wherein the value of the integer multiple corresponds to a decimal value of the symbol.

9. The apparatus according to claim 8, wherein the light source is a light-emitting diode.

10. The apparatus according to claim 9, wherein the data is exchanged wirelessly with a mobile terminal.

11. The apparatus according to claim 8, wherein a value of a respective symbol is encoded at least partially by a duration of the blanking of the light source within the pulse width modulation cycle.

12. The apparatus according to claim 11, wherein a value of a symbol is encoded at least partially by arranging the blanking of the light source within the pulse width modulation cycle.

13. The apparatus according to claim 8, wherein in the case of a set pulse duty factor of zero a binary transmission takes place and whereby the second bright-up time range is considerably shorter than the pulse width modulation cycle.

14. The apparatus according to claim 13, wherein an optical output of the light source is increased by a factor which corresponds to a quotient of the duration of the second bright-up time range and the twofold value of the pulse width modulation cycle.

* * * * *